United States Patent
Galamba et al.

(10) Patent No.: US 12,134,360 B2
(45) Date of Patent: Nov. 5, 2024

(54) IMPACT AND CUT-THROUGH RESISTANT, SELF-LOCATING, MULTILAYERED TEXTILE SLEEVE AND METHOD OF CONSTRUCTION THEREOF

(71) Applicant: FEDERAL-MOGUL POWERTRAIN LLC, Southfield, MI (US)

(72) Inventors: Steve Galamba, West Chester, PA (US); Fernando Salcedo, Southfield, MI (US); Alice Kaing, Margny les Compiegne (FR); Jocelyn Pacquelet, Saint Etienne Roilaye (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 17/846,666

(22) Filed: Jun. 22, 2022

(65) Prior Publication Data

US 2022/0410824 A1    Dec. 29, 2022

Related U.S. Application Data

(60) Provisional application No. 63/214,258, filed on Jun. 23, 2021.

(51) Int. Cl.
  *B60R 16/02*    (2006.01)
  *D03D 1/00*    (2006.01)
(52) U.S. Cl.
  CPC ....... *B60R 16/0215* (2013.01); *D03D 1/0043* (2021.05)

(58) Field of Classification Search
  CPC ............ B60R 16/0215; B60R 16/0207; D03D 1/0043; D03D 3/02; H01B 7/0045
  See application file for complete search history.

(56) References Cited

U.S. PATENT DOCUMENTS

| | | |
|---|---|---|
| 2,759,990 A | 8/1956 | Bean |
| 3,155,769 A | 11/1964 | Burley |
| | (Continued) | |

FOREIGN PATENT DOCUMENTS

| | | |
|---|---|---|
| CN | 209281929 U | 8/2019 |
| DE | 1465317 B1 | 11/1971 |
| | (Continued) | |

OTHER PUBLICATIONS

International Search Report, mailed Sep. 13, 2022 (PCT/US2022/073116).

*Primary Examiner* — Paresh Paghadal
(74) *Attorney, Agent, or Firm* — Robert L. Stearns; Dickinson Wright PLLC

(57) ABSTRACT

A protective member for a wire harness and electrical member fixed thereto, a wire harness assembly, and a method of constructing a protective member for a wire harness and electrical member fixed thereto are provided. The protective member includes a tubular woven wall extending between opposite open ends about a central axis and a tubular braided wall fixed to the tubular woven wall. One end of the tubular woven wall is configured to overlie the electrical member to provide protection thereto, and the tubular braided wall extends away from the other of the opposite open ends of the tubular woven wall about the central axis for operable attachment a wire harness.

14 Claims, 4 Drawing Sheets

(56) References Cited

U.S. PATENT DOCUMENTS

| | | | |
|---|---|---|---|
| 4,868,967 A * | 9/1989 | Holt | F16L 47/20 |
| | | | 174/135 |
| 4,877,923 A | 10/1989 | Sahakian | |
| 6,150,611 A | 11/2000 | Imai | |
| 9,378,865 B2 | 6/2016 | Broughton | |
| 10,830,663 B2 | 11/2020 | Coelho | |
| 2014/0318852 A1 | 10/2014 | Adachi et al. | |
| 2017/0036412 A1* | 2/2017 | Malloy | B32B 1/08 |
| 2019/0029149 A1 | 1/2019 | Shimizu et al. | |
| 2019/0329486 A1 | 10/2019 | Goulet | |
| 2021/0007251 A1* | 1/2021 | Dousteyssier | B21F 45/06 |

FOREIGN PATENT DOCUMENTS

| | | |
|---|---|---|
| GB | 2046500 A | 11/1980 |
| IN | 110085358 A | 8/2019 |

* cited by examiner

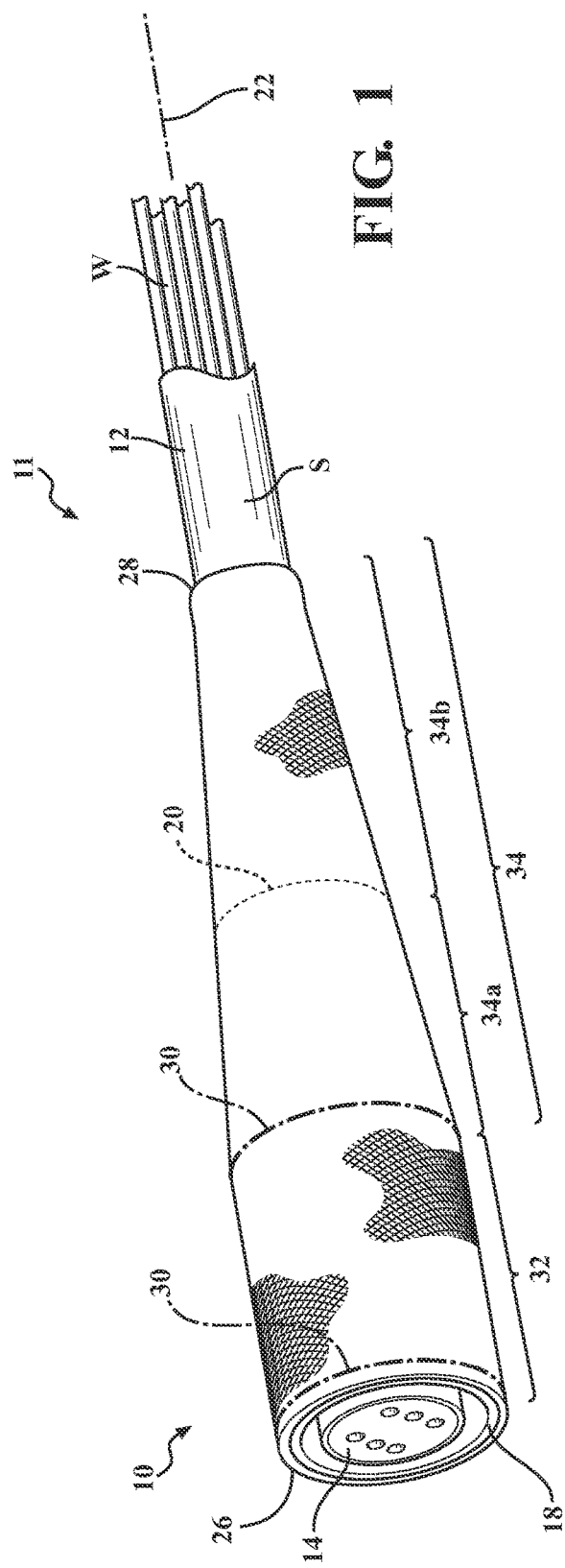
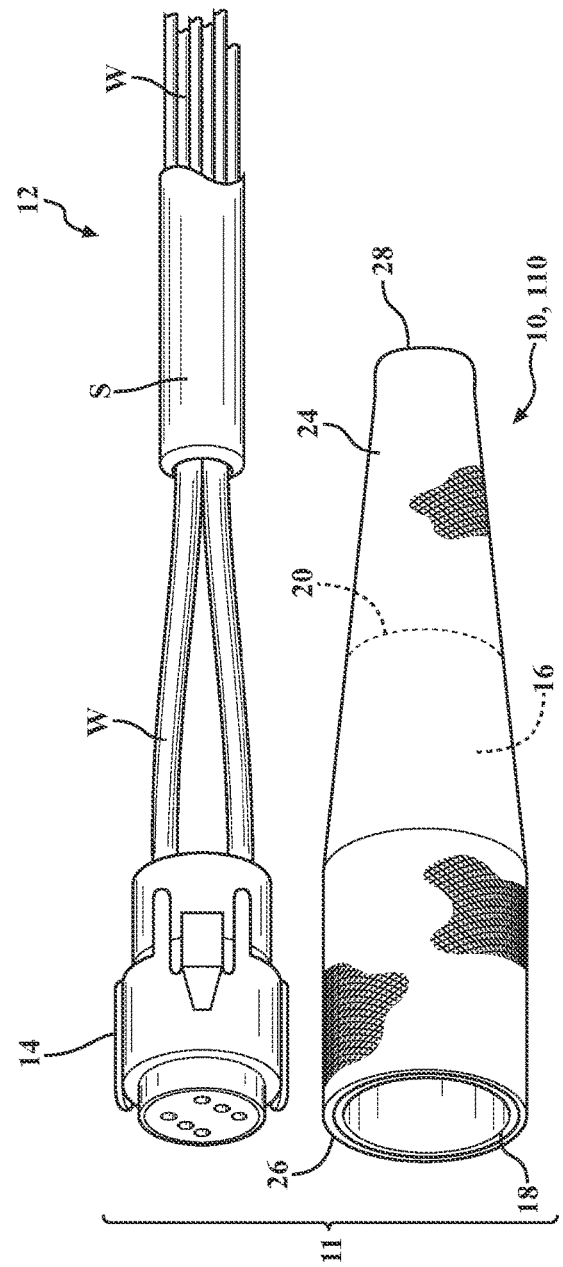
FIG. 1
FIG. 1A

IMPACT AND CUT-THROUGH RESISTANT, SELF-LOCATING, MULTILAYERED TEXTILE SLEEVE AND METHOD OF CONSTRUCTION THEREOF

CROSS-REFERENCE TO RELATED APPLICATION

This application claims the benefit of U.S. Provisional Application Ser. No. 63/214,258, filed Jun. 23, 2021, which is incorporated herein by reference in its entirety.

BACKGROUND OF THE INVENTION

1. Technical Field

This invention relates generally to textile sleeves for protecting connectors and elongate members extending therefrom, and more particularly to impact and cut-through resistant, self-locating, multilayered tubular sleeves.

2. Related Art

Connectors and sensors used in automotive applications, such as high voltage connectors and oxygen sensors, are often mounted within the engine compartment of a vehicle where they are subject to a harsh environment including intense radiant heat, sources of abrasion and constant vibration during vehicle operation. In view of the harsh environment, it is advantageous to cover the relatively delicate connectors and sensors with protective members which can damp vibration, protect against abrasion and reflect radiant heat. Such protective members often comprise an elongated, rigid, tubular shroud sized to surround the connector or sensor, and can include an inner damping layer of a non-woven material, for example, polyester felt.

Due to the nature of the protective member and its environment, it is difficult to attach the protective member to the connector or sensor in a manner which will allow the connector or sensor to be reliably secured in a desired position, while also allowing the protective member to be readily removable for installation and servicing of the connector or sensor. Adhesives, tape and frictional fits, including via hose-type clamps, are used to effect attachment, but these methods all suffer various disadvantages. Adhesive attachment to the connector of sensor, while generally secure, permanently attaches the protective member to the sensor. As a result, this method does not allow for easy removal of the protective member for servicing of the connector or sensor or permit reuse of the protective member. In addition, tape and friction fits can be unreliable and not feasible in view of the heat and vibration encountered by the connector or sensor within the engine compartment. Further, tape can be unsightly, particularly if an end of the tapes becomes detached.

Further, a wire harness connected to the connector or sensor also needs to be protected. Typically, a separate sheath is used to cover the wire harness up to the connection location to the connector or sensor. A transition region between the connector or sensor and the wire harness can prove challenging to protect. It is known to wrap the tape used to fix the protective member about the connector or sensor to also secure the sheath to a side of the connector or sensor; however, the tape results in the same issues discussed above, and further, can result in less than desired protection in the transition region against impact forces, heat, and contamination.

Accordingly, what is needed is a protective member that provides enhanced impact and cut-through resistance to protect a connector or sensor, while also providing the same protection about a wire harness connected to the connector or sensor, including throughout a transition region therebetween. It is further desired, to provide the protective member being able to be freely flexed throughout the transition region without buckling and/or while maintaining protection throughout the transition region, while maintaining an aesthetically pleasing appearance, being economical in manufacture and assembly, and exhibiting a long and useful life.

SUMMARY OF THE INVENTION

One aspect of the disclosure provides a protective member for a wire harness and electrical member fixed thereto. The protective member includes a tubular woven wall extending between opposite open ends about a central axis and a tubular braided wall fixed to the tubular woven wall and extending away from one of the opposite open ends of the tubular woven wall about the central axis.

In accordance with another aspect, the tubular braided wall is fixed to an outer surface of the tubular woven wall.

In accordance with another aspect, the tubular braided wall is welded to an outer surface of said tubular woven wall via at least one weld joint formed by melted and solidified material of at least one of said tubular woven wall and said tubular braided wall.

In accordance with another aspect, the at least one weld joint includes at least one annular weld joint extending circumferentially about the outer surface of the tubular woven wall.

In accordance with another aspect, the at least one weld joint includes a plurality of weld joints.

In accordance with another aspect, the plurality of weld joints includes a plurality of annular weld joints extending circumferentially about the outer surface of the tubular woven wall, with the plurality of annular weld joints being spaced axially from one another along the central axis.

In accordance with another aspect, one of the plurality of annular weld joints is immediately adjacent one of the opposite open ends of the tubular woven wall.

In accordance with another aspect, the tubular woven wall has a woven inner layer and a woven outer layer, with the woven inner layer and the woven outer layer extending from one of the opposite open ends to the other of the opposite open ends.

In accordance with another aspect, the tubular woven wall can be woven solely with multifilament yarns to provide maximum impact resistance.

In accordance with another aspect, the multifilament yarns are provided having a denier between about 2090-2310.

In accordance with another aspect, the multifilament yarns are high tenacity polyethylene terephthalate to facilitate forming a strong, reliable bond with the yarns of the braided wall.

In accordance with another aspect, the tubular braided wall can be braided solely with monofilament yarns to provide maximum abrasion and cut-through resistance, thereby optimizing the hoop strength and protection to the underlying woven wall, electrical connector and wire harness.

In accordance with another aspect, the monofilament yarns of the braided wall can be provided as high tenacity polyethylene terephthalate to facilitate forming a strong, reliable bond with the yarns of the woven wall.

In accordance with another aspect, a wire harness assembly is provided. The wire harness assembly includes a wire harness having a plurality of wires connected to an electrical member with a textile sleeve disposed about the plurality of wires; a tubular woven wall extending between opposite open ends about a central axis, with one of the opposite open ends being disposed about the electrical member with the tubular woven wall extending away from the electrical member to the other of the opposite open ends; and a tubular braided wall fixed to the tubular woven wall and extending beyond the other of the opposite open ends about the central axis and away from the tubular woven wall into engagement with the textile sleeve.

In accordance with another aspect of the invention, a method of constructing a protective member for a wire harness and electrical member fixed thereto is provided. The method includes weaving a tubular wall extending between opposite open ends about a central axis; braiding a tubular wall; and fixing the braided tubular wall to the woven tubular wall so that the braided tubular wall extends away from one of the opposite open ends of the tubular woven wall about the central axis.

In accordance with another aspect of the invention, the method can further include weaving the tubular wall solely with multifilament yarns.

In accordance with another aspect of the invention, the method can further include braiding the tubular wall solely with monofilament yarns.

In accordance with another aspect of the invention, the method can further include extending the braided tubular wall along the entirety of the woven tubular wall and bonding the braided tubular wall to an outer surface of the woven tubular wall.

In accordance with another aspect of the invention, the method can further include performing the bonding in a welding process.

In accordance with another aspect of the invention, the method can further include weaving the tubular wall as a dual layer wall.

In accordance with another aspect of the invention, a protective member for a wire harness and electrical member fixed thereto consists of: a tubular woven wall extending between opposite open ends about a central axis, and a tubular braided wall fixed to the tubular woven wall and extending away from one of the opposite open ends about the central axis.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 1 is a schematic perspective view of a multilayered sleeve constructed in accordance with one aspect of the invention shown disposed about an electrical member and wire harness to be protected;

FIG. 1A is a view similar to FIG. 1 showing the multilayered sleeve and the electrical member and wire harness prior disposing the multilayered sleeve about the electrical member and wire harness;

DETAILED DESCRIPTION OF PREFERRED EMBODIMENTS

Figure 2:
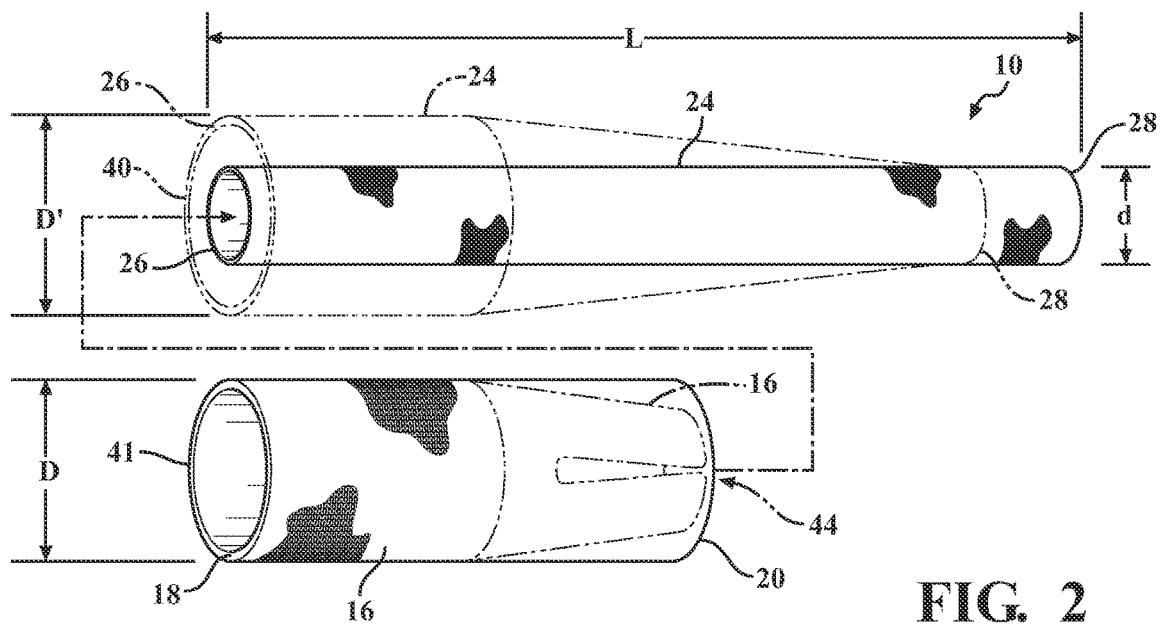
FIG. 2 is a schematic exploded perspective view of the multilayered sleeve of FIG. 1 showing a configuration of an outer wall of the multilayered sleeve, in solid, prior to being disposed about an inner wall of the multilayered sleeve, also shown in solid prior to being disposed in the outer wall, and showing a configuration of the outer wall of the multilayered sleeve, in phantom, after being disposed about the inner wall of the multilayered sleeve, also shown in phantom after being disposed in the outer wall.

Referring in more detail to the drawings, FIGS. 1 and 1A illustrate a self-locating protective member 10 for a wire harness 12 and electrical member 14 fixed to the wire harness 12, with all of the aforementioned forming a wire harness assembly 11. The electrical member 14 can be any one of an electrical connector, such as a high voltage electrical connector, a sensor, such as an oxygen sensor, or otherwise. The protective member 10 provides protection against impact forces to the electrical member 14, such as may be experienced in a vehicle crash condition, as well as protection against cutting, abrading, or the like to the electrical member 14 and wire harness 12, such that the protective member 10 is impact and cut-through resistant. Accordingly, the protective member 10 is particularly useful in an environment, such as an engine compartment of a motor vehicle or other type of vehicle, by way of example and without limitation, requiring electrical members 12 to be protected against high impact and cutting forces.

The protective member 10 includes a tubular textile wall 16. The tubular textile wall 16 is formed via a desired interlacing process, such as weaving, knitting or braiding. In a preferred embodiment, the tubular textile wall 16 is formed of interlaced yarns in a weaving process, and is referred to hereafter as woven wall 16. The woven wall 16 extends along a longitudinal central axis 22 between opposite open ends 18, 20. The protective member 10 further includes a tubular braided wall, referred to hereafter as braided wall 24. The braided wall 24 extends between opposite ends 26, 28 about the central axis 22, and is fixed to the woven wall 16 against separation therefrom. The braided wall 24 has a first region 32 fixed to a first portion 36 of the woven wall 16 via any desired fixation mechanism, including an adhesive and/or weld joint, by way of example and without limitation, as discussed further below, and a second region 34 detached from a second portion 38 of the woven wall 16. The second region 34 is moveable by being both contractible and extendible axially about and along the central axis 22 for movement relative to the underlying second portion 38. Accordingly, the second region 34 is extendible away from one of the opposite open ends 18, 20 and away from the woven wall 16, and in the illustrated embodiment, the second region 34 can be readily extended away from the first region 32 and away from the open end 20 of woven wall 16 in supported, overlying relation with the wire harness 12, and ultimately in to fixed engagement with the wire harness 12. The braided wall 24 can be fixed to first portion 36 of the woven wall 16, such as to an outer surface 29 of the woven wall 16, via any desired fixation mechanism. Accordingly, the braided wall 24 forms an outermost wall of the protective member 10, while the woven wall 16 forms an innermost wall of the protective member 10. Thus, the wire harness assembly 11 includes the wire harness 12 having a plurality of wires W connected to the electrical member 14 with a protective bundling textile sleeve S disposed about the plurality of wires W. The tubular woven wall 16 disposed about the electrical member 14 with the tubular woven wall 16 extending away from the electrical member 14 to the other of the opposite open ends 20; and the tubular braided wall 24 fixed to the tubular woven wall 16 and extending beyond the other of the opposite open ends 20 about the central axis 22 and away from the tubular woven wall 16 into engagement with the textile sleeve S.

The fixation mechanism used to fix the first region 32 of the outer braided wall 24 to the first portion 36 of the inner woven wall 16 can include stitching, adhesive, staples, and in one preferred embodiment, via at least one, and shown as a plurality of weld joints 30, such as via an ultrasonic welding process, by way of example and without limitation. The plurality of weld joints 30 can be formed as spot welds or as annular weld joints 30 extending circumferentially about the outer surface of the woven wall 16, with the plurality of annular weld joints 30 being spaced axially from one another along the central axis 22. In a non-limiting embodiment, one of the plurality of annular weld joints 30 is formed at respective radially aligned ends 40, 41 of the first region 32 and the first portion 36, immediately adjacent the end 18 of the woven wall 16 that is flush with the end 26 of the braided wall 24, and another of the annular weld joints 30 is formed at opposite respective radially aligned ends 42, 43 of the first region 32 and the first portion 36. It is contemplated that additional weld joints can be formed between the weld joints 30 located at the opposite ends 40, 41, 42, 43, as desired.

The woven wall 16 and the braided wall 24 are shown as having generally flush, radially aligned ends 18, 26, by way of example and without limitation, with the braided wall 24 extending along the full length of the woven wall 16 in overlying engagement therewith. In an exemplary embodiment, the braided wall 24 has a length L, as braided and while in a relaxed, non-extended state, that is greater than a full length of the woven wall 16, such that the second region 34 of the braided wall 24 extends beyond the opposite end 20 of the woven wall 16 to the free, unsupported end 28 (not supported by the woven wall 16). A first portion 34a of the braided wall second region 34 is supported by the underlying second portion 38 of the woven wall 16 in detached relation therewith for relative movement there along. Accordingly, the first portion 34a is axially moveable along the second portion 38 of the woven wall 16, such that the tubular braided wall 24 is axially compressible and axially extendable along the second portion 38 of the woven wall 16. A remaining second portion 34b of the second region 34 of the braided wall 24 is cantilevered from the woven wall 16 in unsupported fashion, with the second portion 34b extending to the free end 28. The second portion 34, if needed to reduce a diameter thereof, can be extended axially away from the first portion 32 and axially away from the woven wall 16 so as to be reduced in diameter and brought into engagement with the outer surface S of the wire harness 12. The ability of the braided wall 24 to be reduced in diameter is facilitated by the ability of the braided yarns to change relative angles of inclination with one another while the braided wall 24 is being axially stretched, thereby causing openings between the braided yarns to be altered in shape and reduced in size. The end 28 of the braided wall 24 that is reduced in diameter and brought into engagement with the outer surface S of the wire harness 12 can be fixed to the outer surface S of the wire harness 12 via any desired fixation mechanism, including tape, adhesive, weld joint, tie wrap, hose clamp, or the like.

The woven wall 16 can be tightly woven solely with multifilament yarns to provide maximum impact resistance and maximum coverage to inhibit the passage of contamination. In accordance with one preferred embodiment, the multifilament yarns have a denier between about 2090-2310 dtex. Further, to facilitate fixation to the braided wall 24, the multifilaments can be formed of high tenacity polyethylene terephthalate (PET), which can be readily welded via being melted and solidified. If desired, in addition to multifilaments, the woven wall 16 can include polymeric monofilaments, which can be readily welded via being melted and solidified, as discussed above.

The braided wall 24 can be braided solely with monofilament yarns to provide maximum forming capability (formed to retain a generally cylindrical, tubular configuration) and strength, abrasion resistance and cut-through protection to the underlying woven wall 16, electrical member 14 and wire harness 12. In accordance with one preferred embodiment, the monofilament yarns are provided as polymeric material, such as a high tenacity polyethylene terephthalate (PET), by way of example and without limitation, thereby being optimally suited to be welded to the like material multifilaments and/or monofilaments of the woven wall 16. As such, the welding process used to form the weld joints 30, such as an ultrasonic welding process, by way of example and without limitation, causes the material of the woven wall 16 and the material of the braided wall 24 to melt, intermix and solidify to form a reliable bond between the woven wall 16 and the braided wall 24. With the bonds formed via the weld joints 30 being so strong and reliable, the pair of circumferentially extending weld joints 30 is sufficient to prevent inadvertent separation of the braided wall 24 from the woven wall 16, with each weld joint 30 being formed adjacent opposite ends of the first region 32 of the braided wall 24.

Upon the braided wall 24 being fixed to the woven wall 12 via the weld joints 30, or prior, if desired, the braided wall 24 can be heat formed, also referred to as heat-set, heat-treated or heat-shaped, to form and maintain a cylindrical shape of the braided wall 24. With the braided wall 24 being shaped to retain a cylindrical shape, the underlying woven wall 16 is maintained in a corresponding cylindrical shape, at least in part by the bias imparted by the braided wall 24, thereby greatly facilitating assembly of the protection member 10 about the electrical member 14. It is to be recognized that the synergy between the multifilaments of the woven wall 16 and the monofilaments of the braided wall 24 provides the protective member 10 with its high impact and cut-through resistance, while also providing the ability of the woven wall 16 to be maintained in a cylindrical shape via the bias imparted by the heat-formed monofilaments of the braided wall 24, thus, greatly facilitating assembly of the protective member about the electrical member 14 and the wire harness 12.

Figure 2A:
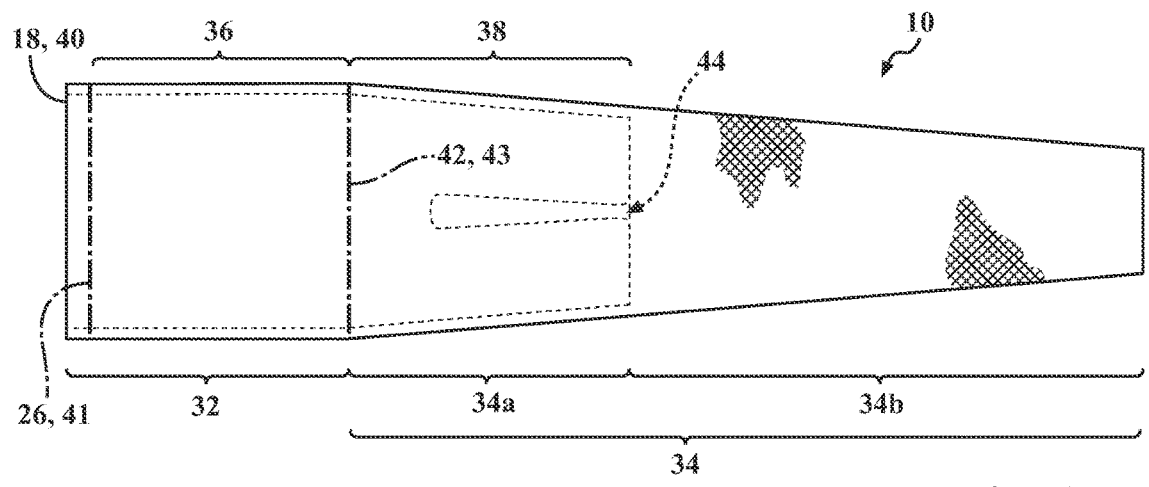
FIG. 2A is schematic assembled side view of the multilayered sleeve of FIG. 2 showing the outer wall of the multilayered sleeve disposed about the inner wall of the multilayered sleeve, with the inner wall shown in hidden lines.
Figure 2B:
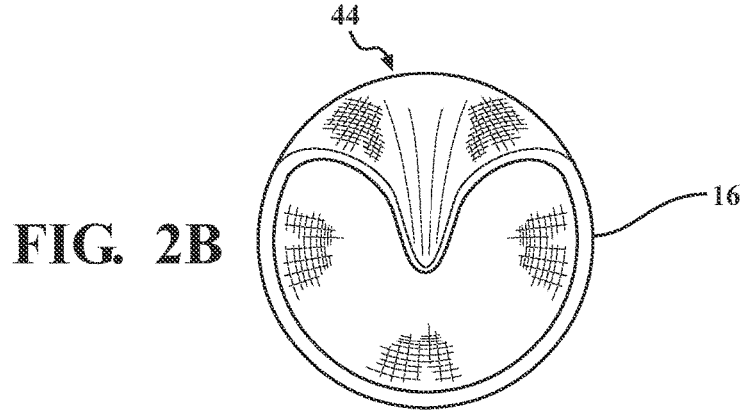
FIG. 2B is an end view of the inner wall shown having a folded region to provide an end region of the inner wall with a tapered, conical configuration.
Figure 3:
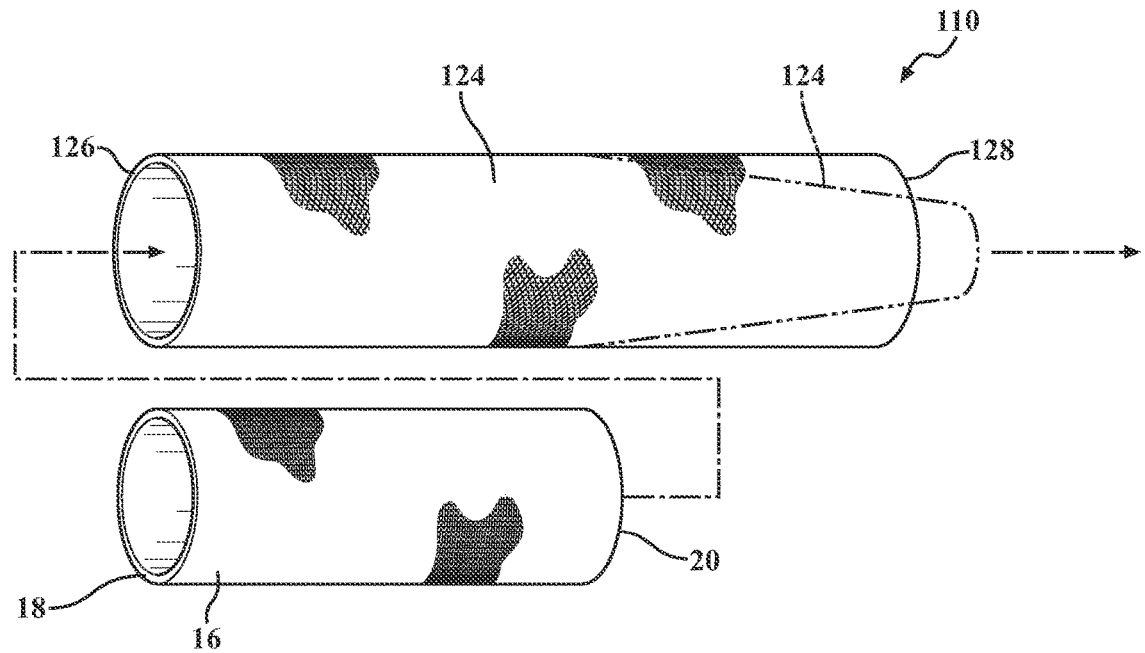
FIG. 3 is an exploded view similar to FIG. 2 of an outer wall and an inner wall of a multilayered sleeve constructed in accordance with another aspect of the invention.
Figure 3A:
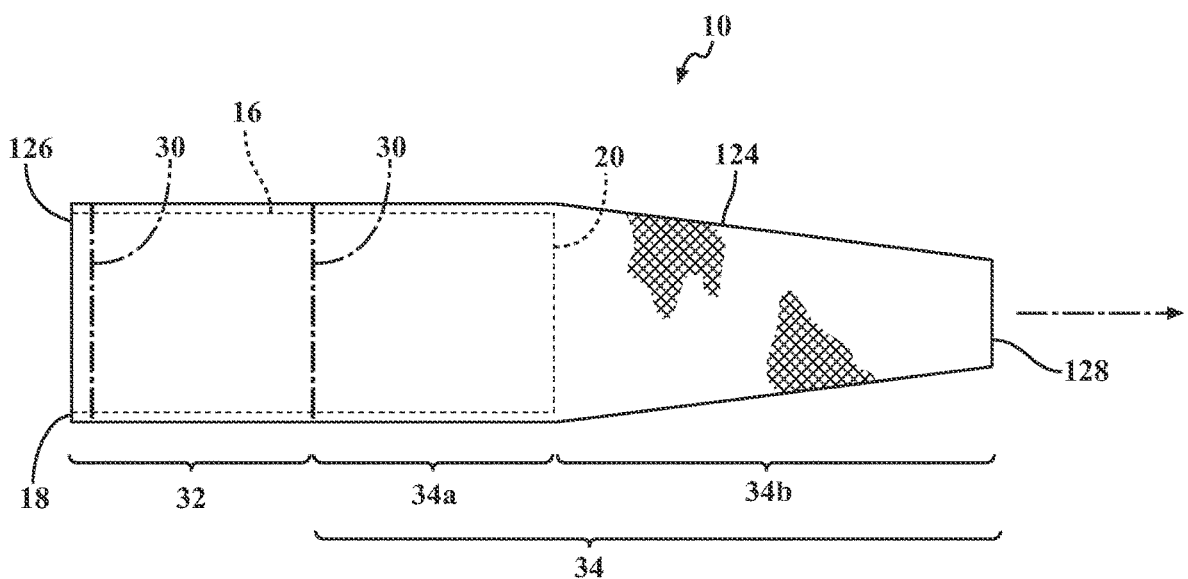
FIG. 3A is an assembled view similar to FIG. 2A of the multilayered sleeve of FIG. 3.

As shown in FIGS. 2-3A, the woven wall 16 of protective member 10 can be formed as a single layer wall, thereby having a single layer of warp and weft yarns woven with one another via any desired weave pattern, such as plain, basket, twill, satin, and variations thereof. The end 18 of the woven wall 16 is formed having a diameter D sized for receipt of the electrical member 14 therein. Further, in the non-limiting embodiment of FIGS. 2 and 2A, the braided wall 24 can be formed having a diameter d, while in an "as braided," relaxed state, that is generally the same as a diameter of the wire harness 12, as shown in solid line of FIG. 2. Then, during assembly, the braided wall 24 can be, at least partially, axially compressed to enlarge the diameter d to a slightly greater diameter D' than the diameter D of the woven wall 16, as shown in phantom of FIG. 2, whereupon the woven wall 16 can be readily disposed inside the enlarged end 26 of the braided wall 24 to bring respective ends 18, 16 into generally flush relation with one another, as shown in FIG. 2A. In accordance with a further aspect, the second portion 38 of the woven wall 16 arranged in radially alignment with the first portion 34a of the braided wall second region 34 can be tapered to facilitate enshrouding the electrical member 12 against contamination. The tapered second portion 38 also provides a more gradual, smooth tapered transition of the braided wall 24 between the electrical member 12, and as shown, between the first region 32 of the braided wall 24 and the outer surface S of the wire harness 12. It is contemplate that the second portion 38 of the woven wall 16 can be formed being tapered, having a conical shape extending along the central axis 22 as woven, or, the woven wall 16 can be woven having a purely cylindrical shape, whereupon the second portion 38 can then be deformed to taken on a conical shape. To deform the cylindrical second portion 38 to take on a conical shape, the second portion 38 of the woven wall 16 can be pressed radially inwardly to form an axially extending indentation, crevice or valley, also referred to as radially inwardly folded region 44, thereby providing second portion 38 having the generally conical shape. The inwardly folded region 44, as best shown in FIG. 2B, is generally U-shaped as viewed looking along the central axis 22, wherein the wire harness 12 can readily extending either side of the U-shaped indentation of the woven wall 16. Accordingly, the second portion 38 of the tubular woven wall 16 would have a generally cylindrical shape extending from the first portion 36 to the end 20 if not for the radially inwardly folded region 44. As such, manufacture of the woven wall 16 is economical by being able to be woven as a continuous cylindrical wall, and thereafter being able to be provided having the generally conical portion.

In FIGS. 3 and 3A, a protective member 110 constructed in accordance with another aspect is shown, wherein the same reference numerals as used above are used to identify like features, with some of the reference numerals being offset by a factor of 100. In this embodiment, a braided wall 124 is braided having a slightly larger diameter D, while in a rest, unbiased state, such that the braided wall 124 does not need to be axially compressed to dispose an inner woven wall 16, constructed as discussed above, therein. Then upon disposing the protective member 110 about the wire harness 12 and an end 126 about the sensor 14, an end 128 of the braided wall 124 can be axially extended away from the sensor 14, whereupon a portion of the braided wall 124 is extended beyond the woven wall 16 and caused to become reduced in diameter into a close fit with an outer surface S of the wire harness 12, whereat any desired fixation mechanism can be used to secure the end 128 of the braided wall 124 to the outer surface S.

Figure 4:
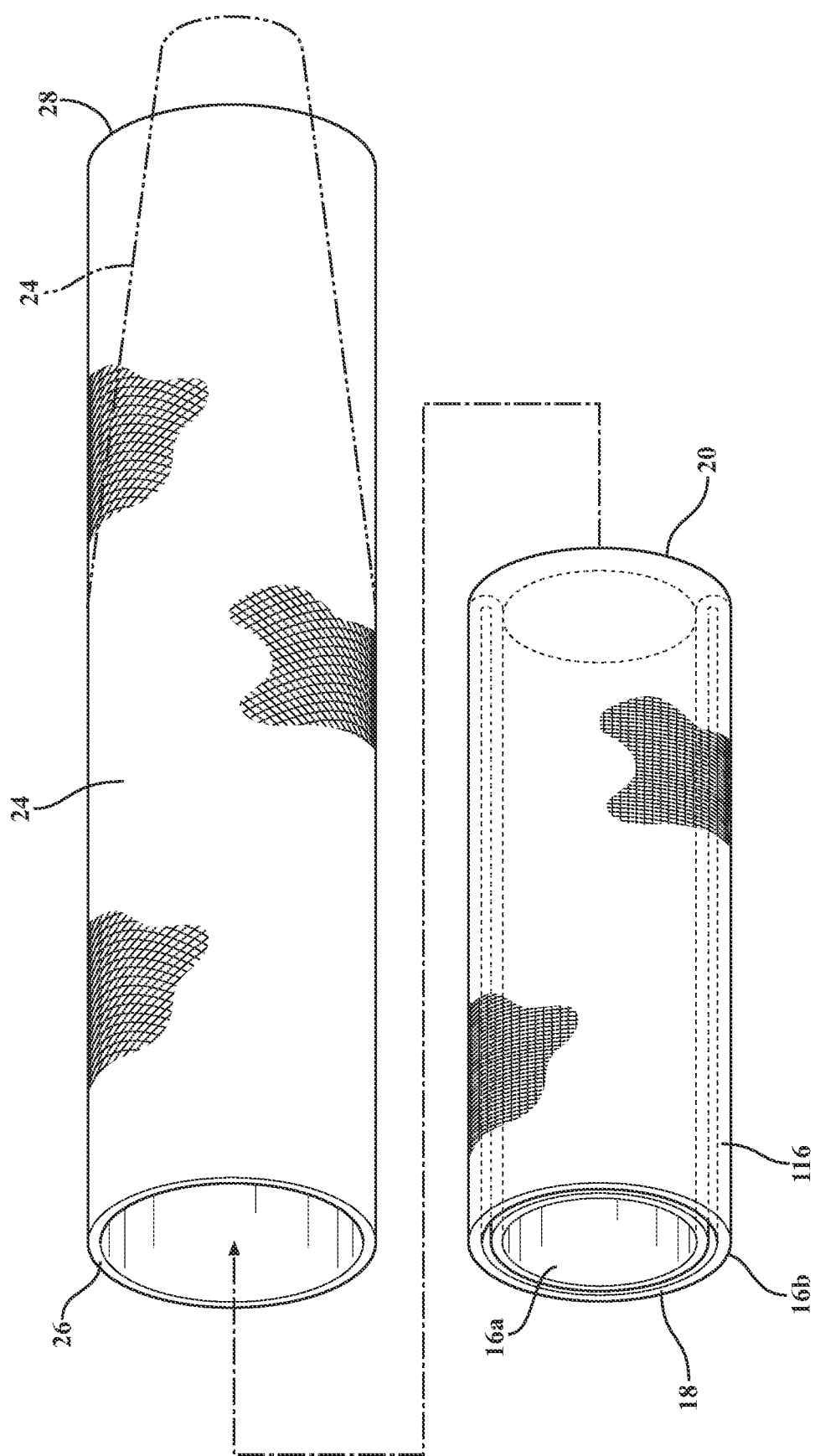
FIG. 4 is an exploded view similar to FIG. 2 of an outer wall and an inner wall of a multilayered sleeve constructed in accordance with another aspect of the invention.

In FIG. 4, a woven wall 216 of a protective member 210 is shown as a dual layer wall, having a woven inner layer 216a and a woven outer layer 216b, with the woven inner layer 216a and the woven outer layer 216b each extending from one of the opposite open ends 218 to the other of the opposite open ends 220. The dual inner and outer layers 216a, 216b thereby form discrete layers of warp and weft yarns, wherein at least some of the warp or weft yarns from one of the layers 226a, 226b can be woven with warp or weft yarns from the other of the layers 226a, 226b. Each of the discrete layers 226a, 226b can be woven via any desired weave pattern, such as plain, basket, twill, satin, and variations thereof. It is to be recognized that further enhanced impact resistance to the electrical member 14 is provided by the dual layer wall 216 in comparison with the single layer wall 16.

In accordance with a further aspect of the disclosure, a method of constructing a protective member for a wire harness and electrical member fixed thereto is provided. The method includes, interlacing yarn to form a tubular textile wall extending between opposite open ends about a central axis. Further, braiding a tubular wall, and fixing a first region of the braided tubular wall to a first portion of an outer surface of the tubular textile wall and leaving a second region of the braided tubular wall in detached relation from an underlying second portion of the outer surface, such that the first region is fixed against movement relative to the first portion, while the second region is axially collapsible relative to the second portion toward the first region, and axially extendible relative to the second portion away from the first region to allow the second region to be extended away from the tubular textile wall about the central axis.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A protective member for a wire harness and electrical member fixed thereto, comprising:
    a tubular textile wall extending lengthwise between opposite open ends about a central axis; and
    a tubular braided wall having a first region fixed to said tubular textile wall and a second region detached from said tubular textile wall, wherein said second region is extendible about said central axis away from one of said opposite open ends of said tubular textile wall, wherein said first region extends along an outer surface said tubular textile wall and is fixed to a first portion of said tubular textile wall adjacent a first one of said opposite ends, said second region extends along a second portion of said tubular textile wall, in detached relation therefrom, adjacent a second one of said opposite ends, wherein said second region of said tubular braided wall is axially extendible along said second portion of said tubular textile wall and axially beyond said second one of said opposite ends, such that said tubular braided wall is axially compressible and axially extendable along said second portion of said tubular textile wall,
    wherein said tubular textile wall is a woven wall.

2. The protective member of claim 1, wherein said first region of said tubular braided wall is fixed against movement relative to said first portion of said tubular textile wall.

3. The protective member of claim 1, wherein said first region and said second region of said tubular braided wall extend along said outer surface of said tubular textile wall radially outwardly from said tubular textile wall, such that said first portion of said tubular textile wall underlies said first region of said tubular braided wall, and said second portion of said tubular textile wall underlies said second region of said tubular braided wall, wherein said second region of said tubular braided wall is extendible away from said tubular textile wall beyond said second one of said opposite ends.

4. The protective member of claim 3, wherein said first region of said tubular braided wall and said first portion of said tubular textile wall have a first diameter, and at least a portion of said second region of said tubular braided wall and said second portion of said tubular textile wall have a second diameter, said first diameter being greater than said second diameter.

5. The protective member of claim 4, wherein said second region of said tubular braided wall is axially extendible beyond said second one of said opposite ends of said tubular textile wall to a third diameter, said second diameter of said tubular textile wall being greater than said third diameter.

6. The protective member of claim 4, wherein said first portion of said tubular textile wall has a generally cylindrical shape extending along said central axis and said second portion of said tubular textile wall has a generally conical shape extending along said central axis.

7. The protective member of claim 6, wherein said second portion of said tubular textile wall has a radially inwardly folded region configured to form the generally conical shape, such that said second portion of said tubular textile wall would have a generally cylindrical shape extending from the first portion if not for the radially inwardly folded region.

8. The protective member of claim 3, wherein said first region of said tubular braided wall is welded to said outer surface of said first portion of said tubular textile wall via at least one weld joint formed by melted and solidified material of at least one of said tubular textile wall and said tubular braided wall.

9. The protective member of claim 8, wherein said at least one weld joint includes at least one annular weld joint extending circumferentially about said outer surface of said first portion of said tubular textile wall.

10. The protective member of claim 9, wherein said at least one weld joint includes a plurality of weld joints.

11. The protective member of claim 1, wherein said tubular textile wall has an inner layer and an outer layer, said inner layer and said outer layer extending from one of said opposite open ends to the other of said opposite open ends.

12. The protective member of claim 1, wherein said woven wall is woven including multifilament and monofilaments.

13. The protective member of claim 12, wherein said multifilaments are woven as warp yarns extending generally parallel to said central axis and said monofilaments are woven as weft yarns extending generally transversely to said warp yarns.

14. The protective member of claim 12, wherein said tubular braided wall is braided solely with monofilament yarns.

* * * * *